United States Patent
Runde et al.

(10) Patent No.: US 7,069,767 B2
(45) Date of Patent: Jul. 4, 2006

(54) METHOD OF DETERMINING INITIAL TRANSMISSION CALIBRATION

(75) Inventors: Jeffrey K. Runde, Fishers, IN (US); Kevin L. Kluemper, Monrovia, IN (US); Scott T. Kluemper, Monrovia, IN (US)

(73) Assignee: General Motors Corporation, Detroit, MI (US)

( * ) Notice: Subject to any disclaimer, the term of this patent is extended or adjusted under 35 U.S.C. 154(b) by 218 days.

(21) Appl. No.: 10/851,395

(22) Filed: May 21, 2004

(65) Prior Publication Data

US 2005/0257632 A1 Nov. 24, 2005

(51) Int. Cl.
*G01M 13/02* (2006.01)
*G12B 13/00* (2006.01)

(52) U.S. Cl. .................... 73/1.71; 73/162; 73/865.9; 702/105

(58) Field of Classification Search .......... 73/1.09–1.1, 73/1.71, 162, 865.9, 118.1; 702/105; 701/51, 701/55–59, 66; 475/158; 29/407.08
See application file for complete search history.

(56) References Cited

U.S. PATENT DOCUMENTS

| 4,070,927 | A | | 1/1978 | Polak | 475/28 C |
| 4,982,620 | A | * | 1/1991 | Holbrook et al. | 74/731.1 |
| 4,989,471 | A | * | 2/1991 | Bulgrien | 74/336 R |
| 5,046,174 | A | * | 9/1991 | Lentz et al. | 701/66 X |
| 5,046,178 | A | * | 9/1991 | Hibner et al. | 701/60 |
| 5,072,390 | A | * | 12/1991 | Lentz et al. | 701/55 X |
| 5,157,608 | A | * | 10/1992 | Sankpal et al. | 701/58 |
| 5,211,079 | A | * | 5/1993 | Runde et al. | 477/61 |
| 6,253,140 | B1 | * | 6/2001 | Jain et al. | 701/67 |
| 6,285,942 | B1 | | 9/2001 | Steinmetz et al. | 701/67 |
| 6,427,109 | B1 | * | 7/2002 | Doering et al. | 701/55 X |
| 6,480,797 | B1 | * | 11/2002 | Fritz et al. | 702/105 X |
| 2002/0032093 | A1 | * | 3/2002 | Kopec et al. | 475/114 |

* cited by examiner

Primary Examiner—Thomas P. Noland
(74) Attorney, Agent, or Firm—Christopher DeVries

(57) ABSTRACT

A process for learning the pressure and volume characteristics for a given torque-transmitting mechanism is established on the final assembly line wherein a powertrain incorporating the desired transmission learning is installed within a vehicle. During the test process, the vehicle speed is generally maintained at Idle and the vehicle shift mechanism is maintained in Park, thereby mechanically locking the transmission output shaft. The torque-transmitting mechanisms to be learned are then engaged and disengaged in a predetermined sequence and the volume of the torque-transmitting mechanisms and the pressure characteristics of the controlling solenoid are learned.

3 Claims, 4 Drawing Sheets

METHOD OF DETERMINING INITIAL TRANSMISSION CALIBRATION

TECHNICAL FIELD

This invention relates to power transmissions and, more particularly, to the initial calibration of power transmissions during vehicle assembly.

BACKGROUND OF THE INVENTION

Many of today's passenger vehicles and small trucks utilize powertrains having an engine and a multi-speed planetary transmission. The multi-speed planetary transmission generally includes a torque converter input mechanism, a multi-speed planetary gear unit, and a final drive unit. The multi-speed planetary gear unit generally has a plurality of torque-transmitting mechanisms that are hydraulically applied to establish gear ratios. In an interchange from one gear ratio to another, at least one torque-transmitting mechanism is disengaged while another is engaged. During ratio interchange and the engagement and disengagement of the torque-transmitting mechanisms, a drive interruption is a characteristic that is noticeable by the vehicle operator as a not smooth ratio transition. In order to provide a smooth transition during interchanges, calibration of the torque-transmitting mechanisms is required.

In many of the powertrains in use today, an electronic control mechanism is used to control the interchange and engagement of the various torque-transmitting mechanisms within the transmission. The electronic control mechanism includes at least two variable solenoid mechanisms, which supply the signals to provide the pressure to the torque-transmitting mechanisms, which are fluid-operated devices.

The electronic control mechanisms in use today generally include what is known as an adaptive portion of the transmission, which is operable to effect changes in torque-transmitting mechanism engagement and disengagement when a shift interchange is not proper. Most of the transmissions in use today have a learning feature within this adaptive portion, which rapidly adjusts the engagement and disengagement procedures of the transmission during the first period of operation after the vehicle has been placed on the road and in service. Thus, the initial calibrations that occur can produce ratio interchanges that are disturbing to the operator and may result in the vehicle being returned to a dealer for transmission correction, which is not necessary since the adaptive system will eventually correct the engagement sequence to be significantly improved.

SUMMARY OF THE INVENTION

It is an object of the present invention to provide an improved method of initial calibration for a power transmission.

In one aspect of the present invention, the initial calibration is performed while the vehicle with the transmission installed is still on the assembly line.

In another aspect of the present invention, the initial calibration is performed on at least two of the torque-transmitting mechanisms when the vehicle has the engine running at least at idle and is placed in neutral or park.

In yet another aspect of the present invention, one of the torque-transmitting mechanisms is fully engaged while a second of the torque-transmitting mechanisms is controlled in engagement in a normal manner.

In still another aspect of the present invention, the controlled torque-transmitting mechanism provides data for the electronic control, which gives the clutch fill-time as well as the pressure characteristics for the torque-transmitting mechanism during disengagement.

In a further aspect of the present invention, the one torque-transmitting mechanism is then calibrated while the second of the torque-transmitting mechanisms is held fully engaged.

In a yet further aspect of the present invention, the third of the torque-transmitting mechanisms is calibrated when one of the first two torque-transmitting mechanisms is fully engaged when the park condition is engaged on the vehicle. The third of the torque-transmitting mechanisms undergoes the same sequence of operation to establish the required calibration characteristics.

In a still further aspect of the present invention, each of the calibration steps is repeated for a number of engagements such that the average values for the calibration characteristics are established and stored in the adaptive learning procedure of the electronic control mechanism.

DESCRIPTION OF AN EXEMPLARY EMBODIMENT

Figure 1:
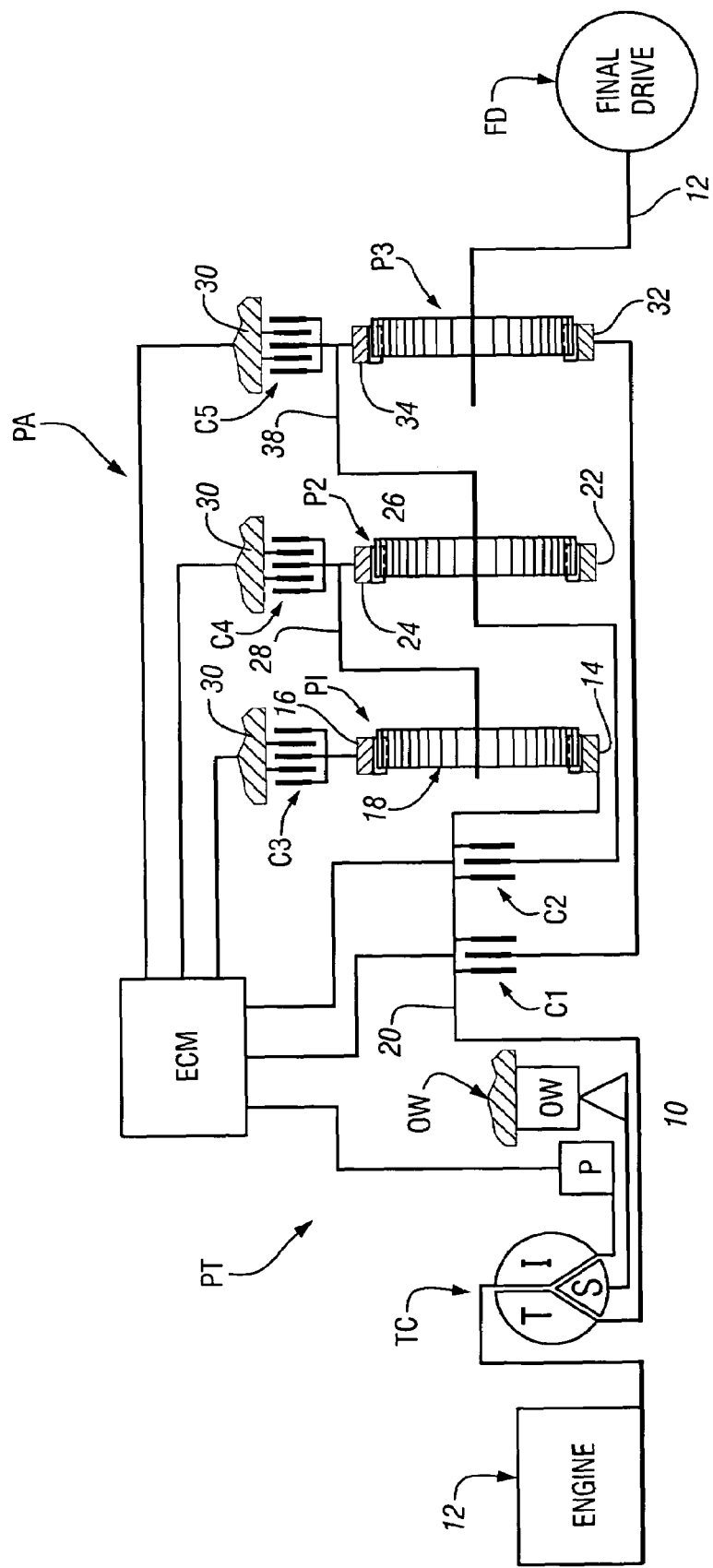
FIG. 1 is a schematic representation of a powertrain in which the power transmission is calibrated with the present invention.

A powertrain PT is shown in FIG. 1 and includes an engine E, a torque converter TC, a planetary gear arrangement PA, and a final drive mechanism FD. The engine E, torque converter TC, and final drive mechanism FD are conventional components generally employed in powertrains. The planetary gear arrangement PA is an automatically shifted multi-speed power transmission, which is the subject matter of U.S. Pat. No. 4,070,927 issued to Polak Jan. 31, 1978, and assigned to the assignee of this application.

The torque converter TC includes an impeller I driven by the engine E, a turbine T driven hydrodynamically by the impeller I, and a stator S, which is grounded through a conventional one-way device OW. The impeller I has a pump P, which supplies fluid through an electronic control module ECM. The ECM is a well-known device used in transmission controls and includes a programmable digital computer, a plurality of solenoid valves, and a plurality of hydraulic valves.

The planetary gear arrangement PA has an input shaft 10, an output shaft 12, a first planetary gearset P1, a second planetary gearset P2, and a third planetary gearset P3, as well as a first torque-transmitting mechanism C1, a second torque-transmitting mechanism C2, a third torque-transmitting mechanism C3, a fourth torque-transmitting mechanism C4, and a fifth torque-transmitting mechanism C5.

The planetary gearset P1 is a simple planetary gearset having a sun gear member 14, a ring gear member 16, and a planet carrier assembly member 18. The sun gear member 14 is driven directly by the input shaft 10 through a hub 20.

The planetary gearset P2 includes a sun gear member 22, a ring gear member 24, and a planet carrier assembly member 26. The sun gear member 22 is selectively connectible with the hub 20 through the torque-transmitting mechanism C1, the planet carrier assembly member 26 is selectively connectible with the hub 20 through a selectively engageable torque-transmitting mechanism C2. The ring gear member 24 and planet carrier assembly member 18 are interconnected by an interconnecting member 28 and are selectively connectible with a transmission housing 30 through the torque-transmitting mechanism C4. The ring gear member 16 is selectively connectible with the transmission housing 30 through the torque-transmitting mechanism C3.

The planetary gearset P3 includes a sun gear member 32, a ring gear member 34, and a planet carrier assembly member 36. The planet carrier assembly member 36 is continuously connected with the output shaft 12 and therefore the final drive mechanism FD. The sun gear member 32 is continuously connected with the sun gear member 22 and selectively connectible with the hub 20 through the torque-transmitting mechanism C1. The ring gear member 34 is selectively connectible with the planet carrier assembly member 26 through an interconnecting member 38. The ring gear member 34 is also selectively connectible with the torque-transmitting mechanism C5.

The torque-transmitting mechanisms C1, C2, C3, C4, C5 are operated in combinations of two to establish six forward speed ratios and one reverse speed ratio between the input shaft 10 and the output shaft 12.

The first forward speed ratio is established with the engagement of the torque-transmitting mechanisms C1 and C5. The second forward speed ratio is established with the interchange of the torque-transmitting mechanisms C4 and C5. The third forward speed ratio is established with the interchange of the torque-transmitting mechanisms C4 and C3. The fourth forward speed ratio is established with the interchange of the torque-transmitting mechanisms C3 and C2. The fifth forward speed ratio is established with the interchange of the torque-transmitting mechanisms C1 and C3. The sixth forward speed ratio is established with the interchange of the torque-transmitting mechanisms C3 and C4.

During the ratio interchanges, the on-coming torque-transmitting mechanism must be controlled with engagement pressure and the out-going torque-transmitting mechanism must also be controlled. If the on-coming torque-transmitting mechanism develops torque capacity before the off-going torque-transmitting mechanism is ready to release torque capacity, then a tie-up occurs and the operator will be aware of the interchange. While such tie-ups are minimal and do not damage any portion of the transmission, it is preferable to provide as smooth an interchange as possible.

To this end, when the transmission has been positioned within a vehicle, the proper electronic harness is installed, the vehicle is on the final assembly line with the engine operating at idle, and the transmission shifted to Park, the torque-transmitting mechanisms C3, C4, and C5 can be pressurized and de-pressurized when engaged and disengaged by manipulating the ECM.

Figure 2:
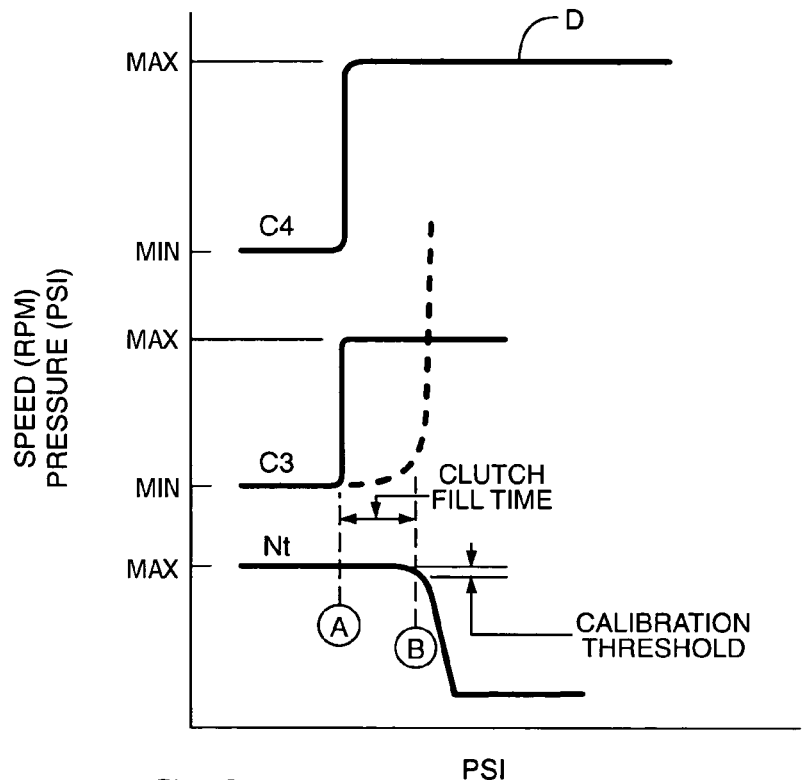
FIG. 2 is a set of curves for elements within the transmission, which are controlled during the calibration.

As seen in FIG. 2, with the torque-transmitting mechanism C4 is fully engaged (line D), the torque-transmitting mechanism C3 is engaged in its normal controlled mode by a solenoid within the ECM. As the torque-transmitting mechanism C3 approaches torque capacity, the turbine T of the torque converter TC will be slowed in speed and brought to a halt when the torque-transmitting mechanism C3 is fully engaged.

As seen in FIG. 2, the turbine speed Nt is essentially equal to the speed of the impeller I which is equal to the speed Ne of the engine 12. The speed Nt begins to decrease as the torque-transmitting mechanism C3 is engaged. Between the points A and B on the turbine speed curve is the clutch fill-time. This is the time required to fill the apply chamber of the torque-transmitting mechanism and begin engagement of the friction plates which are incorporated within the torque-transmitting mechanism. This time value is established through a plurality of engagements and disengagements such that the time to fill approaches the proper calibration value. When the proper calibration value is achieved, the time is recorded within the ECM in the adaptive procedure section. The time arrived at in FIG. 2 defines the clutch fill period and the volume accumulated between points A and B. This determines clutch volume for the torque-transmitting mechanism C3.

Figure 3:
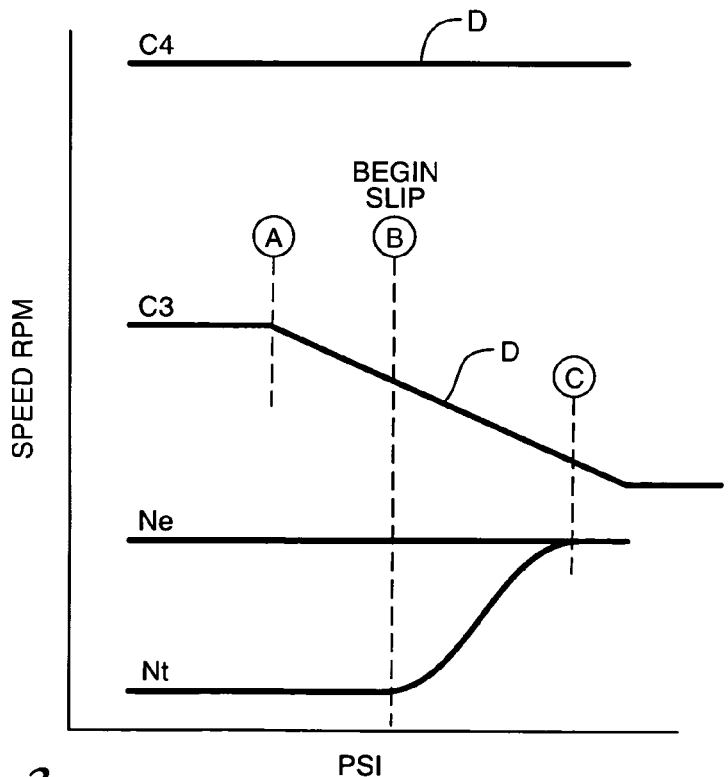
FIG. 3 is a curve representing other characteristics of the transmission elements as they are operated during the calibration process.

With the torque-transmitting mechanism C4 (line D) and the torque-transmitting mechanism C3 have been fully engaged, the curve of FIG. 3 illustrates the operation of disengagement. At point A in FIG. 3, the torque-transmitting mechanism C3 is initially being de-pressurized along a ramp curve D. When the pressure in torque-transmitting mechanism C3 reaches the point B, it will be noted that the speed of the turbine Nt begins to increase. This is the beginning of slip within the torque-transmitting mechanism C3. The pressure within the torque-transmitting mechanism C3 continues to be ramped off until the point C is reached in the curve, at which time the speed of the turbine Nt is essentially equal to the speed of the engine Ne. This is the minimum slip point within the torque converter.

In FIG. 3, the pressure characteristics for the torque-transmitting mechanism C3 are learned by the ECM. During this process, the torque-transmitting mechanisms C3 and C4 are both fully engaged and the turbine T is stopped such that the turbine speed Nt is zero. The torque-transmitting mechanism C3 is ramped off beginning at point A. The torque-transmitting mechanism C3 continues to ramp off when slip occurs at point B, and further continues to ramp until the torque converter slip is small at point C. The return spring pressure at the clutch is learned at point C. At this point the clutch C3 is transmitting zero net torque as evident by the lack of converter slip.

The converter torque indicated at point B defines the clutch torque produced at the pressure command at point B. Thus, the pressure characteristic of the solenoid controlling the torque-transmitting mechanism C3 is learned. This solenoid might be used for the engagement and disengagement of other devices and therefore the solenoid pressure characteristic for all of the torque-transmitting mechanisms controlled thereby is learned.

The above sequence is repeated for the torque-transmitting mechanism C4 while holding the torque-transmitting mechanism C3 fully engaged. This will learn the clutch volume for the torque-transmitting mechanism C4 and additionally, because the torque-transmitting mechanism C4 is controlled by a different solenoid valve, this also learns the solenoid pressure characteristics for all torque-transmitting mechanisms, which use the other solenoid.

Figure 4:
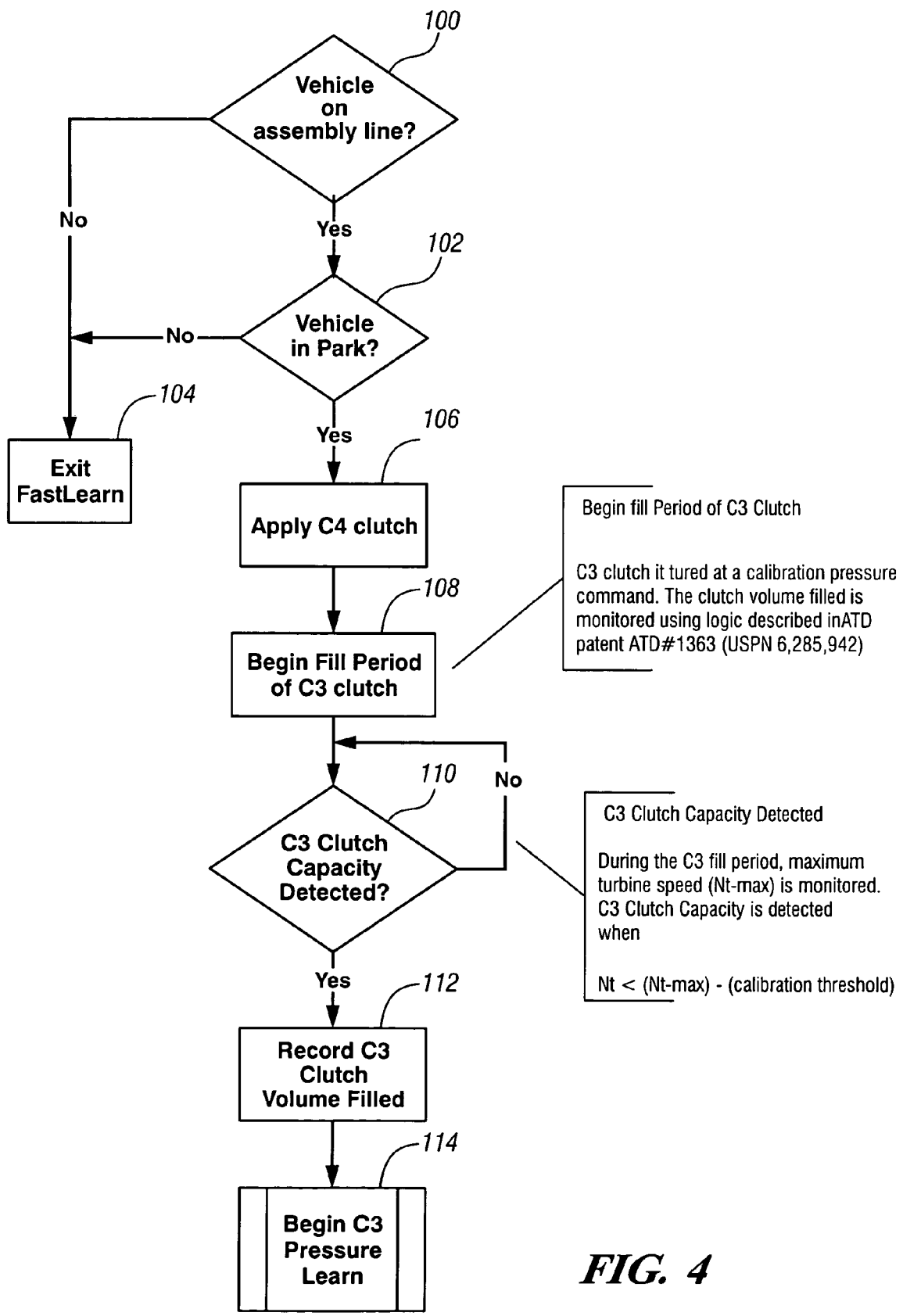
FIG. 4 is a block diagram of an algorithm describing a portion of the calibration process.
Figure 5:
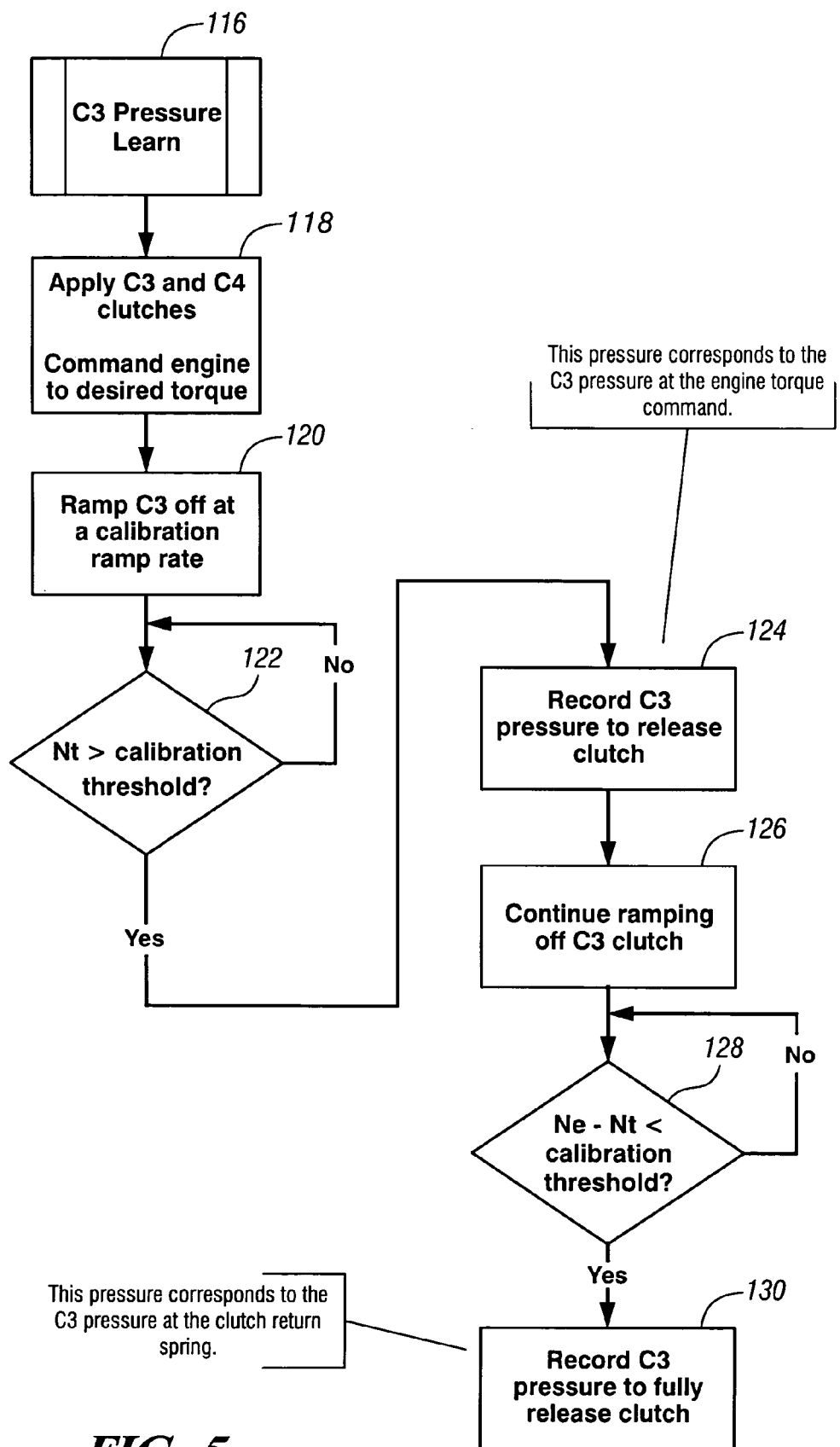
FIG. 5 is a block diagram of another algorithm describing a portion of the calibration process.

The algorithm followed to provide the learning of the engagement and disengagement characteristics required by the torque-transmitting mechanism C3 is shown in FIGS. 4 and 5. In FIG. 4, the process step 100 determines whether the vehicle is on the assembly line. If the answer to this is Yes, the process continues to step 102. If the vehicle is not on the assembly line, the process exits the learning program for the transmission at 104.

In step 102, it is determined if the vehicle is in Park, if not, the process again exits the learning program at 104. If the vehicle is in Park, the process continues to step 106 where the torque-transmitting mechanism C4 is fully applied and then on to step 108, where the torque-transmitting mechanism C3 begins application. During this step, the torque-transmitting mechanism C3 is engaged at a calibrated pressure command. The clutch volume filled is monitored by the logic described in U.S. Pat. No. 6,285,942, issued to Steinmetz, et al. Sep. 4, 2001, which is assigned to the assignee of this application.

The process continues to step 110 where it is determined if the capacity of torque-transmitting mechanism C3 is detected. If the answer is No, it returns and fills until it is; if the answer is Yes, the process continues on to step 112. During step 110, the torque-transmitting capacity of clutch C3 is detected. During the fill period for the torque-transmitting mechanism C3, maximum turbine speed is monitored and the torque capacity of the torque-transmitting mechanism C3 is detected when the speed of the turbine is less than the maximum turbine speed minus a calibration threshold as shown in FIG. 2. During step 112, the volume to fill the torque-transmitting mechanism C3 is recorded and the process is continued to step 114, which is to begin to learn the pressure characteristics of the torque-transmitting mechanism C3.

The process continues to step 116 where the pressure learning process begins and passes the algorithm on to step 118 at which the torque-transmitting mechanisms C3 and C4 are fully applied and the engine is commanded to provide the desired torque. The process passes to step 120 where the control begins to ramp off the torque-transmitting mechanism C3 at a calibrated rate and passes the algorithm to step 122. The process step 122 determines if the speed of the turbine has passed the calibration threshold, and if not, the process continues to monitor the speed until the threshold is reached. The process then goes on to step 124, which records the pressure to release the torque-transmitting mechanism C3. The pressure recorded here corresponds to the pressure of the torque-transmitting mechanism C3 for the set engine torque command.

The process continues at step 126 by continuing to ramp the torque-transmitting mechanism C3 toward the Off condition. At step 128, the clutch mechanism checks to ensure that the torque-transmitting mechanism C3 is fully released and when it is, reports the pressure required to fully release the torque-transmitting mechanism C3. The pressure recorded in step 130 corresponds to the pressure of the torque-transmitting mechanism C3, which represents the pressure required to overcome the return spring within the torque-transmitting mechanism C3.

After step 130, the calibration of torque-transmitting mechanism C3 is completed. These steps 110 through 130 might be processed a number of times until any change noted between adjacent process calibrations is minimal.

Having calibrated the torque-transmitting mechanism C3, the process will again proceed to calibrate the torque-transmitting mechanism C4. The process steps to calibrate the torque-transmitting mechanism C4 are the same as those for the torque-transmitting mechanism C3 except that the torque-transmitting mechanism C3 remains fully engaged during the process and the torque-transmitting mechanism C4 is controlled during engagement and disengagement.

It is also possible to establish the pressure and volume requirements for the torque-transmitting mechanism C5 with this process. To establish these values for the torque-transmitting mechanism C5, the torque-transmitting mechanism C3 is fully engaged and the torque-transmitting mechanism C5 is engaged and disengaged in a manner similar to that described above for the calibration of torque-transmitting mechanisms C3 and C4.

Prior to the beginning of the calibration for the torque-transmitting mechanism C5, this torque-transmitting mechanism is fully engaged and disengaged a fixed number times to purge any error, which might be present in the system. The engagement of torque-transmitting mechanism C5 and torque-transmitting mechanism C3 places the transmission in reverse hydraulically even though the Park position is maintained at the manual control. Therefore, during the calibration of the torque-transmitting mechanism C5 with the powertrain shown in FIG. 1, the precaution of having an operator within the vehicle during the calibration process is employed. This calibration of torque-transmitting mechanism C5 is performed only in Park when an operator is present. Other than that, the same process is used as the learning process for the torque-transmitting mechanisms C3 and C4.

In many electronic-controlled transmissions, only two solenoid control valves are used. Each of the valves will control more that one torque-transmitting mechanism during transmission operation. Once the process has learned the pressure characteristics of a solenoid, this learning is usable during all operations of that solenoid.

As previously mentioned, the methodology to determine the on-coming clutch fill calculation dependent upon clutch pressure is arrived at in U.S. Pat. No. 6,285,942. The characteristics of the remaining torque-transmitting mechanisms C1 and C2 will be via the conventional process that is employed by the ECM. That is an adaptive learning process. With this process a "sped-up" initial adaptive process that causes the shift to converge more rapidly to the desired condition. These adaptive processes are well known to those skilled in the art and have been utilized in transmission controls for a number of years.

The invention claimed is:

1. A method of determining an initial transmission calibration of at least two torque-transmitting mechanisms installed in a vehicle on an assembly line' said method comprising the steps of:
    determining if the vehicle is on the assembly line with the engine at Idle and the transmission in Neutral or Park;
    fully engaging a first of the torque-transmitting mechanisms;
    beginning engagement of a second of the torque-transmitting mechanisms to determine a fill-time and apply chamber volume for the second torque-transmitting mechanism by monitoring a speed of a torque converter turbine in said transmission;
    recording the fill-time and volume;
    determining the pressure characteristic for the second torque-transmitting mechanism by fully applying both of said torque-transmitting mechanisms, reducing the pressure at the second torque-transmitting mechanism until a first predetermined slip speed occurs at the torque converter, recording the pressure, further reducing the pressure at the second torque-transmitting mechanism until a second predetermined slip speed occurs at the torque converter, recording the pressure; and placing the recorded time, volume, and pressures in the directive cells in the transmission.

2. The method of determining an initial transmission calibration of at least two torque-transmitting mechanisms installed in a vehicle on an assembly line defined in claim 1, said method further comprising the steps of:

repeating the process with the second torque-transmitting mechanism fully engaged and controlling the first torque-transmitting mechanism to learn the characteristics thereof.

3. The method of determining an initial transmission calibration of at least two torque-transmitting mechanisms installed in a vehicle on an assembly line defined in claim 1, said method further comprising the steps of:

placing a transmission control in Park;

fully engaging and disengaging a third torque-transmitting mechanism for a plurality of cycles;

fully engaging said second torque-transmitting mechanism;

determining the fill-time and volume of the third torque-transmitting mechanism;

determining the pressure characteristics of the third torque-transmitting mechanism.

* * * * *